(12) United States Patent
Chujoh et al.

(10) Patent No.: US 6,259,736 B1
(45) Date of Patent: Jul. 10, 2001

(54) VIDEO ENCODER AND VIDEO ENCODING METHOD

(75) Inventors: Takeshi Chujoh, Tokyo; Toshiaki Watanabe, Yokohama, both of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/238,885

(22) Filed: Jan. 28, 1999

(30) Foreign Application Priority Data

Jan. 30, 1998 (JP) .................................................. 10-019253

(51) Int. Cl.$^7$ ...................................................... H04N 7/12
(52) U.S. Cl. ...................................................... 375/240.13
(58) Field of Search ........................ 375/240.12, 240.13, 375/240.14, 240.15, 240.16, 240.25, 240.27; 348/400.1, 402.1, 409.1, 413.1, 415.1, 416.1, 425.2, 700; 382/236, 238; 386/111

(56) References Cited

U.S. PATENT DOCUMENTS

| | | | |
|---|---|---|---|
| 4,827,338 | 5/1989 | Gerard | 375/240.18 |
| 5,057,916 | * 10/1991 | Krause et al. | 348/416 |
| 5,491,509 | * 2/1996 | Jeong et al. | 348/402 |
| 5,805,223 | * 9/1998 | Shikakura et al. | 348/402 |
| 5,812,198 | * 9/1998 | Saigusa et al. | 348/416 |
| 5,825,425 | * 10/1998 | Kazui et al. | 348/420 |

FOREIGN PATENT DOCUMENTS

| | | |
|---|---|---|
| 0 485 798 | 5/1992 | (EP) . |
| 0 712 252 | 5/1992 | (EP) . |
| 9-247682 | 9/1997 | (JP) . |

OTHER PUBLICATIONS

Dajiuklas et al., "Packet video transmission in an ATM network using forced frame refreshment", IEEE, Oct. 1996, pp. 784–787.*

Patent Abstracts of Japan, vol. 1998, No. 04, Mar. 31, 1998, JP 09 331533, Dec. 22, 1997.

* cited by examiner

*Primary Examiner*—Vu Le
(74) *Attorney, Agent, or Firm*—Oblon, Spivak, McClelland, Maier & Neustadt, P.C.

(57) ABSTRACT

A video encoder comprises an encoding section for selectively performing on an input video signal an intra-coding mode for intraframe coding, an inter-coding mode for interframe coding, and a non-coded mode in which no coding is performed and the previous frame is used for display, a mode selector section for adaptively selecting among the coding modes for each predetermined region in the input video signal, and a refresh section for detecting a motion region from within a frame and setting up an intraframe-coded region for refresh in a portion of a refresh range including the motion region. The refresh section determines which of a motion region having motion and a still region with no motion each of intraframe-coded macroblocks belongs to, determines the refresh range in the next frame on the basis of the result of the determination, and instructs the intra mode to the mode select circuit when a macroblock to be coded belongs to the refresh range.

19 Claims, 9 Drawing Sheets

VIDEO ENCODER AND VIDEO ENCODING METHOD

BACKGROUND OF THE INVENTION

The present invention relates to a video encoder and a video encoding method. More specifically, the present invention relates to a video encoder and a video encoding method by which picture frames are refreshed by inserting cyclically an intraframe-coded region into each of the picture frames.

A video codec (coder/decoder) has a problem that, when errors are mixed in bit streams in communication channels and storage systems, picture data cannot be decoded correctly, causing deterioration in picture quality. With low-bit-rate transmission channels and radio networks in particular, bit errors and cell loss are easy to occur. It is therefore required to increase error resilience.

There are some countermeasures against errors. One of the effective countermeasures is to refresh picture frames by inserting cyclically into the picture frames a picture region on which intraframe coding is performed. Such a picture region can be decoded independently of other frames and thus are not affected by errors mixed in bit streams in the other frames. Therefore, the use of the refresh method of inserting an intraframe coding picture region cyclically into each of picture frames allows the error resilience to be increased.

As a refresh method, a method called intraslice is known. For example, with MPEG-2 Video (ISO-IEC CD 13818-2), switching is made between intraframe coding mode (intra-mode) and interframe coding mode (intermode) in units of 16×16 pixels (macroblock). For example, an intraslice-based refresh method has been proposed by which, of a frame composed of vertical 30 macroblocks and horizontal 44 macroblocks, a region consisting of two macroblock lines (vertical two macroblocks×horizontal 44 macroblocks) is encoded in the intra-mode, the intraframe-encoded region is shifted by two lines every frame, and 15 frames form one cycle.

In this intraslice scheme, when a search is made for the motion vector associated with a macroblock present in a region above the intraframe-coded region of the current frame to be encoded, the search range from the previous frame serving as the reference frame is restricted and the search is not made from the un-refreshed region.

For example, the search of motion vectors for macroblocks in the current frame is restricted so that, of macroblocks in the previous frame, macroblocks in corresponding locations to the intraframe-coded region in the current frame are not included in the motion-vector search region. In the case of intraslice in which the direction of refresh is from top to bottom, therefore, all the motion vectors directed from bottom to top become restricted. Such restrictions allow frames to become refreshed completely by, at the worst, the (2 cycles−1)st frame from a frame in which errors have occurred and allow error propagation to converge.

For example, assume that the cycle of intraslice is four frames and errors have occurred in the entire bit stream in the first frame in one cycle of four frames. In this case, in coding a macroblock in an input frame in the inter-mode, only macroblocks which, of macroblocks in the reference frame, are present in the same location as and the region above that macroblock to be coded in the input frame are used for the motion vector search. Thus, the range through which the effects of errors propagate converges by the bottom most region in the frame.

The number of coded bits in the intra-mode is two times or more larger than that in the inter-mode when the same quantization parameters are used. Since there are constraints on transmission rates, the transmission rate of bit streams is required to be limited to a certain value or less. When the intraslice-based refresh scheme is used, therefore, it is required to reduce the number of coded bits by the amount corresponding to the intraslice to be inserted by making quantization parameters larger than in the case where no intraslice is inserted. However, this forms a serious cause of deterioration in picture quality.

Recently, as disclosed in Japanese Unexamined Patent Publication No. 9-247682 by way of example, several adaptive refresh schemes have been proposed which adaptively refresh only regions in a scene that have large motion to thereby reduce the insertion number of intra coding regions. For still regions having no motion, error concealment techniques can be employed by which corresponding regions in the previous frame are embedded into the current frame. Thus, by refreshing adaptively only regions that are large in motion, it becomes possible to effect a reduction in information content while maintaining the error resilience.

The conventional adaptive refresh schemes share a problem that the motion that intra-coded regions have in a scene are not considered.

That is, the conventional adaptive refresh schemes adopt the principle that, once a region is refreshed by an intra-coded region, it is not refreshed until new motion associated with that region is detected. Thus, once a region is coded in the intra mode, it is uniquely considered as a still region at that point and excluded from the refresh range until new motion associated with that region is detected.

For this reason, in the event that, when a scene change occurs and the picture is still after the scene change, intra-coded regions on the scene change frame drop out due to errors during transmission to the decoder, error-recovery is delayed, resulting a serious problem. This is illustrated in FIG. 11.

In FIG. 11, it is supposed that a scene change occurs at frame N+1 and there is no motion for a while in regions of macroblock MBi in succeeding frames. In general, the switching between coding modes, such as the intra mode and the inter mode, is made adaptively on a macroblock by macroblock basis according to the degree of temporal correlation in an input video signal. For example, when, like a scene change, a drastic change occurs in the picture, so that correlation between previous and current frames is lost completely, the intra mode is used. Thus, most of the macroblocks in the scene change frame N+1 are coded in the intra mode. When the conventional type of adaptive refresh is performed from top to bottom in a four-frame cycle from frame N+2, in frame N+2 the macroblock MBi is in its turn to be refreshed as shown. However, since the macroblock MBi is coded in the intra mode in previous frame N+1, the refresh of the macroblock MBi is inevitably skipped in frame N+2. In this case, the inter mode is chosen as the coding mode for the macroblock MBi in frame N+2. However, since there is no motion, the not-coded mode is actually used in which the corresponding macroblock in the previous frame is used for display without being coded.

After that, MBi's turn for refresh comes again in frame N+6. Unless motion is detected in the macroblock MBi by that time, the refresh of the macroblock is skipped in frame N+6 as well.

Thus, the macroblock MBi is not refreshed for a long time. If, therefore, the macroblock MBi in the scene change frame N+1 drops out due to transmission errors, correct information after scene change cannot be obtained for regions of the macroblock MBi, so that the picture in the previous frame N prior to the scene change is displayed as it is.

As described above, the conventional intraslice-based refresh scheme, which increases considerably the amount of coding, requires to make quantization parameters large in order to attain coding at the same rate, degrading the picture quality.

Moreover, with the adaptive refresh schemes to refresh only motion regions, since no refresh is performed for a while after scene change, error-recovery is delayed in the event that errors are mixed in the scene change frame, degrading the quality of displayed picture.

Furthermore, when the motion vector search range is restricted in order to ensure error-recovery by refresh, correct motion vectors cannot be found depending on the picture motion, degrading the picture quality.

BRIEF SUMMARY OF THE INVENTION

It is an object of the present invention to provide a video coder and a video encoding method which permit the effects of transmission errors to be weakened and thereby the picture quality to be improved without increasing the amount of coding.

According to an aspect of the present invention, there is provided a video encoder comprising an encoding section for selectively performing an intra-coding mode for intraframe coding of an input video signal, an inter-coding mode for interframe coding, and a non-coded mode in which no coding is performed and the previous frame is used for display, a mode selector section for adaptively selecting among the coding modes for each predetermined region in the input video signal, and a refresh control section for detecting a motion region from within a frame and setting up an intra-coded region for refresh in a portion of a refresh range including the motion region, the refresh control section having a determination section for making a determination of, for each of intra-coded regions coded by the encoding section in the intra-coding mode, which of a motion region and a still region it belongs to and a refresh determination section responsive to the determination section for including intra-coded regions that belong to a motion region in the refresh range and excluding intra-coded regions that belong to a still region from the refresh range, and the encoding section intra-coding regions to be refreshed determined by the refresh determination section.

This video encoder supposes an adaptive refresh scheme that selects only a motion region within a frame as a refresh range and inserts an intra-coded region in part of the refresh range. That is, a still region is excluded from the refresh range. Thus, compared with the normal intraslice, since the still region is not refreshed, the number of macroblocks to be encoded in the intra mode is decreased and, at the same rate, the quantization parameters can be made small correspondingly, which helps improve the picture quality.

Further, in determining the refresh range, unlike the conventional refresh, the motion of the intra-coded region on the frame is taken into consideration.

That is, an examination is made of the degree of correlation between each of picture regions encoded in the intra mode and the corresponding picture region in the previous frame and a determination is made of which of a motion region having motion and a still region having no motion the picture region belongs to. Based on the result of this determination, the refresh range is determined. In this case, the intra-coded region that belongs to the motion region is included in the refresh range in the next frame and the intra-coded region that belongs to the still region is excluded from the refresh range in the next frame so that error-recovery can be made by refresh even if the intra-coded region that belongs to the motion region drops out by errors during transmission to the decoder. Thus, by changing dynamically the refresh range on a picture region by picture region basis according to the presence or absence of motion of the intra-coded region in the previous frame, an intra-coded picture region, if it is a motion region, continues to be selected as the refresh range until it is later intra-coded again and considered to belong to a still region. Thus, in such situations as there is a scene change and the picture is still after the scene change, an intra-coded macroblock on the scene change frame is treated as a motion region and refreshed at a predetermined time determined by the refresh cycle. Even if, therefore, an intra macroblock in the scene change frame drops out during transmission to the decoder, error-recovery can be made relatively early based on refresh.

The present invention further provides a video encoder which, when intra-coded regions that are considered to belong to a motion region are included in one frame in a predetermined number or more, determines that the frame is a scene change frame and changes the location at which an intra-coded region for refresh is set up in the next frame so that a cyclic refresh operation is started at an end of the next frame.

In general, the scene change frame contains a large amount of coding and hence has a high probability of errors being mixed in, provided that the probability of occurrence of error remains unchanged. When errors are mixed in, since correlation between current and previous frames is lost, a techniques, such as error concealment, cannot be used. By identifying a scene change and starting a refresh operation at an end of the frame, even if errors occur in the scene change frame, it becomes possible to recover from the errors, at the worst, in one refresh cycle of a predetermined number of frames.

In addition, the present invention provides a video encoder which, when a region in the next frame in the same location as a region in the previous frame where the intra-coded region for refresh has been set up is encoded in the inter-coding mode, inhibits motion vector search, of motion vectors in the direction opposite to the direction of refresh, only for motion vectors from a region in the previous frame for which the determination by the refresh control section is a motion region.

To ensure error-recovery in (2 cycles−1) times, the conventional intraslice scheme, as described previously, wholly inhibits the search for motion vectors in the direction opposite to the direction of refresh. With the still region there is little possibility of errors being mixed in. Thus, by removing the still region from the motion vector search range, the motion vector search range is narrowed down, effecting an improvement in picture quality.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
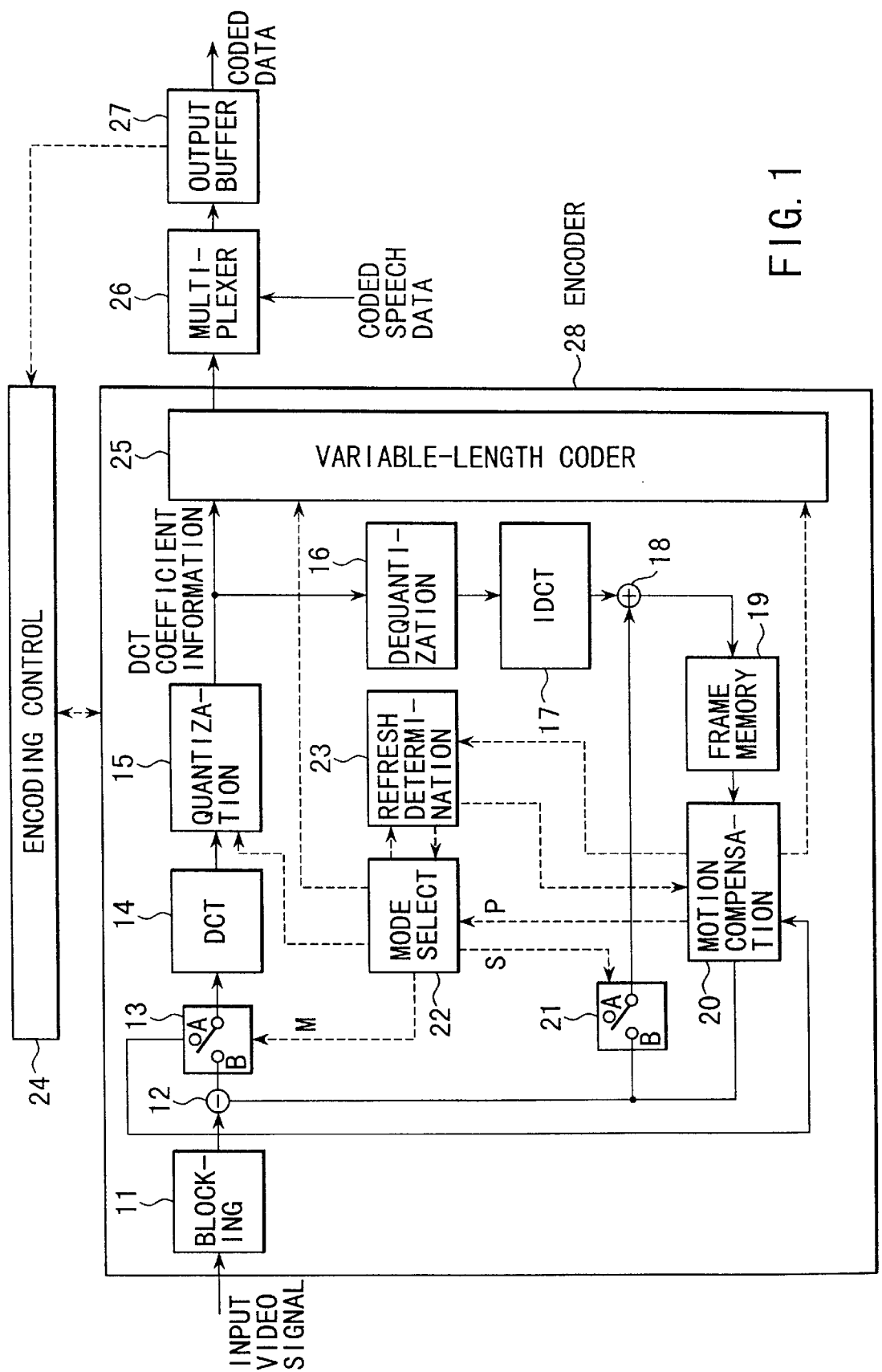
FIG. 1 is a block diagram of a video coder according to a first embodiment of the present invention.

In FIG. 1, an input video signal is divided into macroblocks in a blocking circuit 11. The input video signal having divided into macroblocks is entered into a subtracter 12 where the input video signal and a prediction video signal to be described later are subtracted and their difference yields a prediction residual error signal. Either of the prediction residual signal and the input video signal from the blocking circuit 11 is selected by a mode selection switch 13 and then subjected to discrete cosine transform in a DCT circuit 14. DCT coefficient data obtained in the DCT circuit 14 are quantized in a quantization circuit 15. The output of the quantization circuit 15 is divided into two; one is variable-length coded in a variable length coder 25.

The other of the divided outputs of the quantization circuit 15 is dequantized and inverse DCT coded in sequence in a dequantization circuit 16 and inverse DCT (IDCT) circuit 17 and then added in an adder 18 to a prediction picture signal from a switch 21, thereby producing a local decoded signal. The local decoded signal is stored into a frame memory 19 and then fed into a motion compensation circuit 20. The motion compensation circuit performs the motion compensation process, such as motion detection and motion vector search, on the basis of correlation between the input video signal and the video signal in the previous frame stored in the frame memory 19, producing the prediction video signal and sending necessary information to a mode selector 22 and a refresh determination circuit 23.

An encoding control circuit 24, used for rate control, controls coding on the basis of coded information from an encoder section 28 and the buffer amount of an output buffer 17 and sends necessary information to the variable length encoder circuit 25. In the variable length encoder circuit 25, DCT coefficient information is encoded together with motion vector information and mode information MODE. Image data produced by the coding is sent to a multiplexer circuit 26 where it is combined with encoded speech data and other encoded data and the resulting multiplexed signal is then transmitted as coded data (bit stream) over a transmission channel with the transmission rate smoothed in the output buffer 27.

The mode selector circuit 22 makes an adaptive selection between macroblocks for interframe coding and macroblocks for intraframe coding based on prediction information P from the motion compensation circuit 20 which indicates the degree of intermacroblock correlation.

For intraframe coding, the switch 13 is switched to terminal A by mode selection switch information M and the switch 21 is switched to terminal A by switch information S. For interframe coding, on the other hand, the switch 13 is switched to terminal B and the switch 21 is switched to terminal B.

Coding modes include an intra-mode (INTRA) for intraframe coding, an inter-mode (INTER) for interframe coding, and a non-coding mode (NOT_CODED) in which corresponding macroblock information in the previous frame is used as it is for display. A selection is made adaptively among these coding modes on a macroblock-by-macroblock basis. Normally, the INTRA mode is selected in the case where there is no interframe correlation. Where interframe correlation can be employed for prediction, the INTER mode is selected. Where there is no change in picture and hence coding is unnecessary, the NOT_CODED mode is selected.

In addition, when the refresh determination circuit 23 issues an instruction to perform refresh, the mode selection circuit 23 selects the INTRA mode.

The mode select information MODE indicating a coding mode selected by the mode select circuit 22 is sent to the variable length encoding circuit 25 and the refresh determination circuit 23. The refresh determination circuit makes a determination as to whether each macroblock is to be included in a refresh region or not on the basis of the selected coding mode indicated by the mode select mode MODE and the presence or absence of motion in intraframe-coded macroblocks. Based on the result of this determination, whether refresh is to be performed or not is determined.

That is, the present embodiment supposes the adaptive refresh scheme that selects only motion regions in each frame as a refresh range. However, in determining the refresh range, unlike the conventional adaptive refresh scheme, the motion of picture across frames at each intra macroblock coded in the INTRA mode is considered. In this case, for an intra macroblock for which the determination is that it belongs to a motion region, its region is included in the refresh range in the next frame so that the refresh will provide recovery from errors even if the macroblock itself drops out by errors during transmission to the decoder. An intra macroblock for which the determination is that it belongs a still region is excluded from the refresh range in the next frame. In this manner, the refresh range in the next frame is dynamically changed on a macroblock-by-macroblock basis according to the presence or absence of motion of picture at each intra macroblock in the previous frame.

Figure 2:
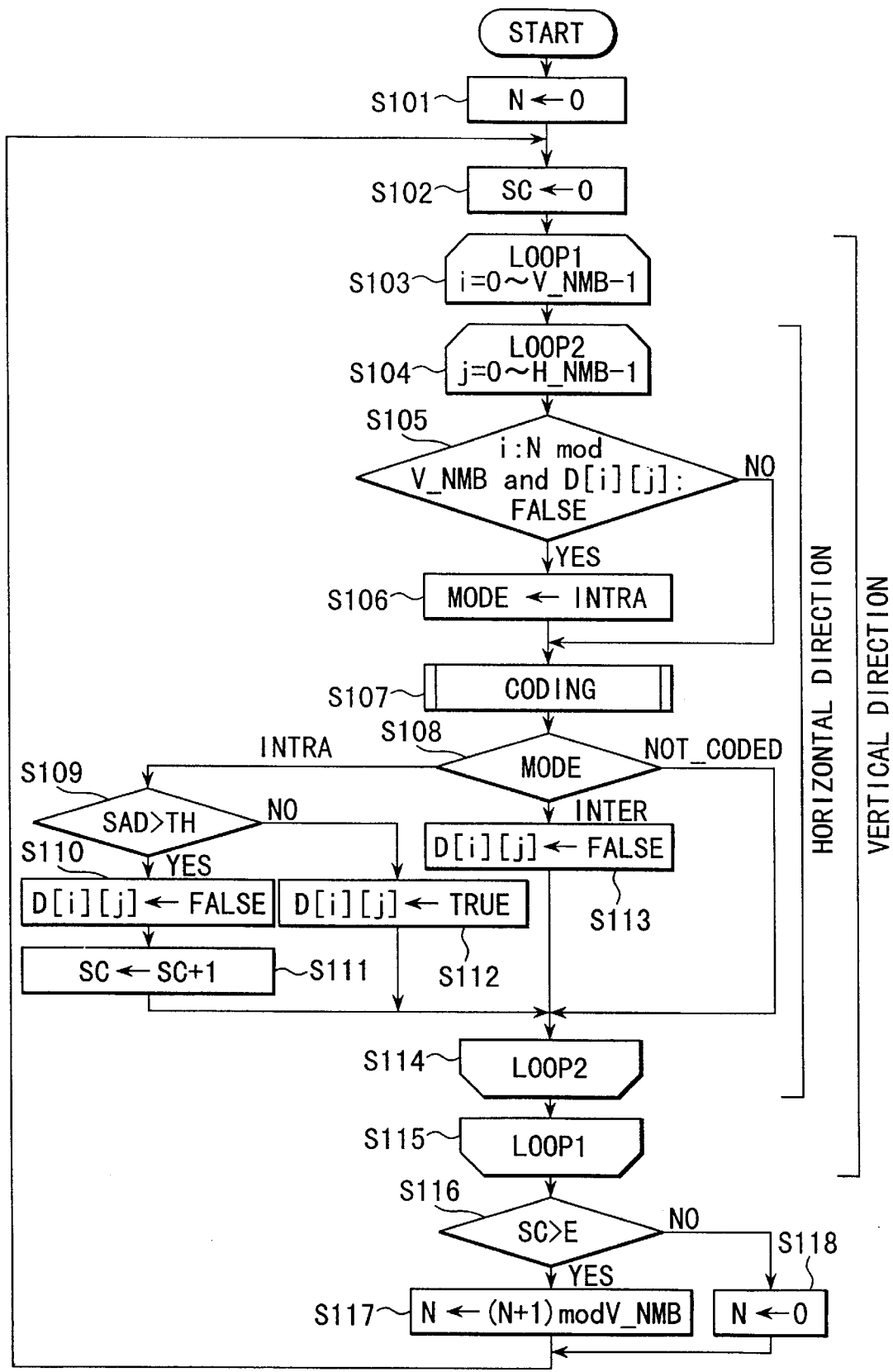
FIG. 2 is a flowchart for the coding process in the video coder of FIG. 1.

FIG. 2 is a flowchart for the processing operation of the refresh determination circuit 23, which illustrates the operation of performing cyclic refreshing by shifting the INTRA coding region from top to bottom in units of horizontal one macroblock line from frame to frame.

Here, i and j represent addresses in the vertical and horizontal directions, respectively, in the frame of a macroblock to be coded. V_NMB and H_NMB represent the numbers of macroblocks in the vertical and horizontal directions, respectively, in the frame. N is the count in a counter indicating a macroblock line at a refresh location.

A two-dimensional array D[i][j] contains elements for managing refresh control information indicating for each macroblock whether it belongs to a motion region needing refresh or not on the basis of the history of motion region/still region determinations for each macroblock. The refresh control information for a macroblock on which rewriting has been performed, namely, a macroblock for which the determination is motion region because of the presence of a picture change, is set to FALSE. The refresh control information for a macroblock for which the determination is that there is no change in picture is set to TRUE.

The FALSE indicates that the corresponding macroblock currently belong to a motion region. Unless the FALSE is rewritten to the TRUE, that macroblock is refreshed in a specific frame determined by the refresh cycle.

The counter SC, provided in the refresh determination circuit 23, counts the number of INTRA macroblocks for which the determination is motion region for the purpose of determination of scene change.

First, before starting coding, the counter value N to find the refresh location is initialized to 0 (step S101).

Next, the counter SC for scene change determination is initialized to 0 before an input 1 frame is coded (step S102).

In loop 1 and loop 2, the refresh determination and the coding process are performed for each macroblock in the frame. In loop 2 composed of steps S104 though S114, processing is performed on the same macroblock line in the horizontal direction. By nesting loop 1 inside loop 1 composed of steps S103 and S104, the macroblock line which is an object of processing is shifted from top to bottom, thereby processing one frame in its entirety.

In step S105, an examination is made as to whether or not two conditions are met: (1) the remainder of division of the refresh counter value N by the number of macroblocks in the vertical direction, V_NMB, is equal to address i of a macroblock that is currently an object of coding; and (2) the value of array D [i][j] is FALSE. If the macroblock that is going to be coded belongs to the macroblock line to be refreshed, then N modulo V_NMB is equal to i, the address of the macroblock that is going to be coded. In addition, if the array D[i][j] value is FALSE, then it is decided that the macroblock that is going to be coded belongs to a motion region that needs to be refreshed.

If, therefore, N modulo V_NMB equals the address i of the macroblock that is going to be coded and the array D[i][j] value is FALSE indicating the necessity of refresh, then the refresh is determined and the coding mode information MODE is rewritten to the INTRA mode (step S106).

After the coding process (step S107), a coding mode determination is made (step S108) and then the array D[i][j] is updated by coding mode type.

If the MODE is INTRA, then in order to determine whether the macroblock is still, the sum (SAD) of absolute values of prediction residuals of the macroblock for which the motion vector given from the motion compensation circuit 20 is (0, 0) is compared with a threshold TH (step S109). That is, an examination is made of to which degree the macroblock coded in the INTRA mode differs from the macroblock of the same address in the previous frame. If SAD is larger than TH, the determination is that the picture is in motion. In this case, the corresponding array D[i][j] value is set to FALSE indicating the necessity of refresh (step S110) and the count in the counter SC for scene change determination is incremented by one (step S111). On the other hand, if SAD is not larger than TH, it is determined that the macroblock is still. In this case, the corresponding array D[i][j] value is set to TRUE, indicating that there is no need of refresh (step S112).

If the MODE is INTER, it is decided that there is motion in the macroblock and then the corresponding array D[i][j] value is set to FALSE indicating the necessity of refresh (step S113).

If the MODE is NOT_CODED, the array D[i][j] is not updated and the operation goes to the next loop.

As a result, the array D[i][j] value is rewritten to TRUE only when a macroblock in a still region is refreshed. That is, when it is determined that a macroblock coded in the INTRA mode belongs to a motion region or when a macroblock is coded in the INTER mode, the array D[i][j] value is kept at FALSE and the macroblock continues to be selected as a refresh range until the macroblock at the same location in the succeeding frame as the macroblock is coded again in the INTRA mode and it is determined that it belongs a still region.

After the termination of loop 1 and loop 2, that is, when coding for one frame is completed, the counter value SC for scene change determination is compared with a threshold E (step S116). If SC>E, it is decided that the frame for which coding has completed is not a scene change frame at which a scene changes. In this case, to advance the fresh line by one, (N+1) is divided by V_NMB and the remainder is set as a new value for N (step S117). If, on the other hand, SC is not greater than E, it is decided that the frame for which coding has completed is a scene change frame. In this case, N is reset to 0 (step S118), thereby allowing the refresh operation to be restarted from the top of the next frame.

In the coding process (step S107), the motion compensation circuit 20 inhibits motion compensation from a motion region among un-refreshed regions in the reference frame to produce a prediction picture signal.

Figure 3:
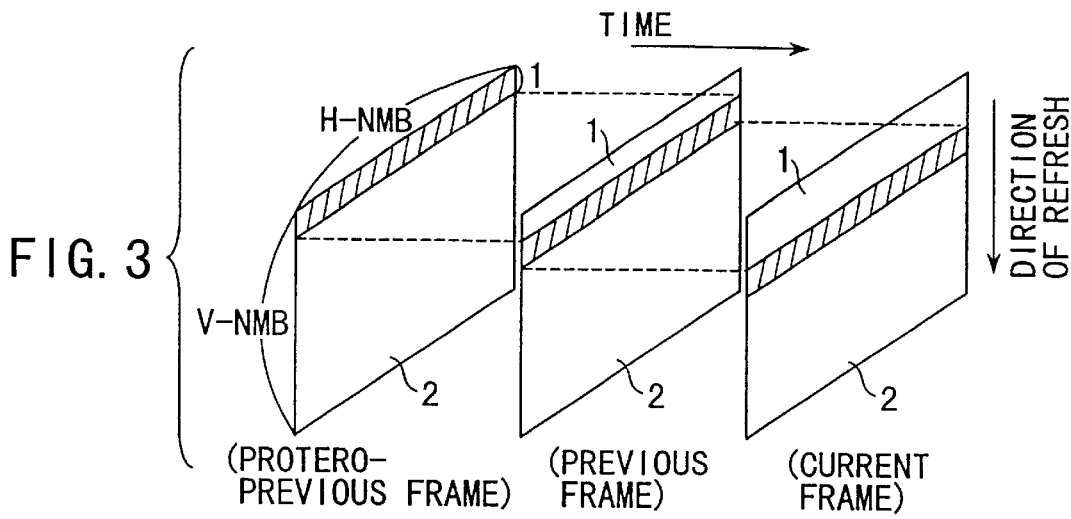
FIG. 3 is a schematic representation of a refresh operation using horizontal macroblock lines.
Figure 4:
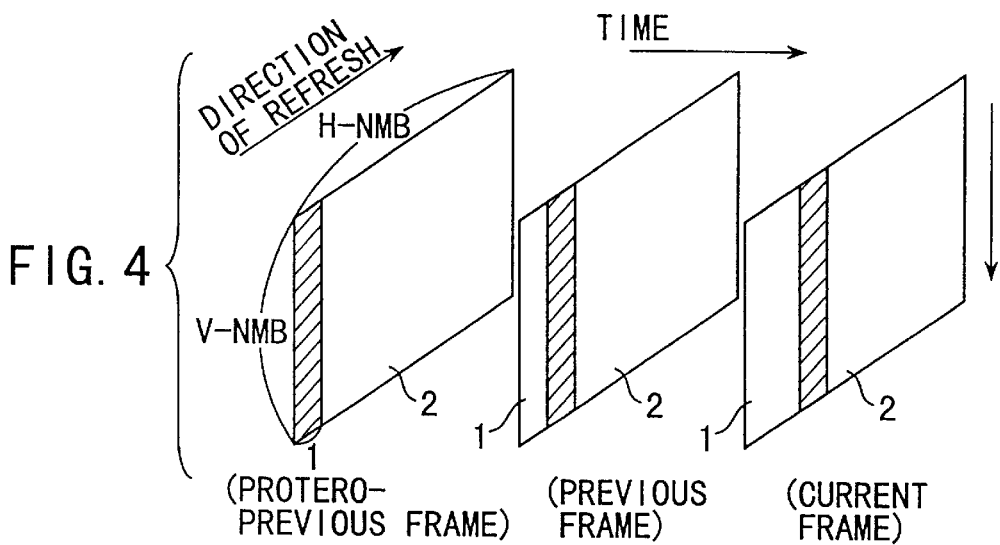
FIG. 4 is a schematic representation of a refresh operation using vertical macroblock lines.

In the above description, the refresh operation is performed based on horizontal macroblock lines as shown in FIG. 3. Alternatively, as shown in FIG. 4, the refresh operation may be performed based on vertical macroblock lines. In such a case, it is required only that the division of N by V_NMB in steps S105 and S117 be replaced with the division of N by H_NMB, or the number of macroblocks in the horizontal direction.

That is, with vertical refreshing, in step S105 determinations of (J:N mod H_NMB) and (D[i][j]:FALSE) are performed. In other words, a check is made as to whether or not the two conditions are both met: (1) the remainder of division of the refresh counter value, N, by the number of macroblocks in the horizontal direction, H_NMB, is equal to the address j of a macroblock that is going to be coded; and (2) the corresponding array D[i][j] value has been set to FALSE. When the macroblock that is going to be coded belongs to a macroblock line to be refreshed, the remainder of division of N by H_NMB will equal the address i of that macroblock. When the array D[i][j] value has been set to FALSE, it means that macroblock belongs to a motion region that needs to be refreshed.

Thus, when, in step S105, N mod H_NMB is equal to the address j of the macroblock that is going to be coded and moreover the corresponding array D[i][j] value indicates FALSE, the coding mode information MODE is rewritten to the INTRA mode, so that a refresh operation is performed.

Figure 5:
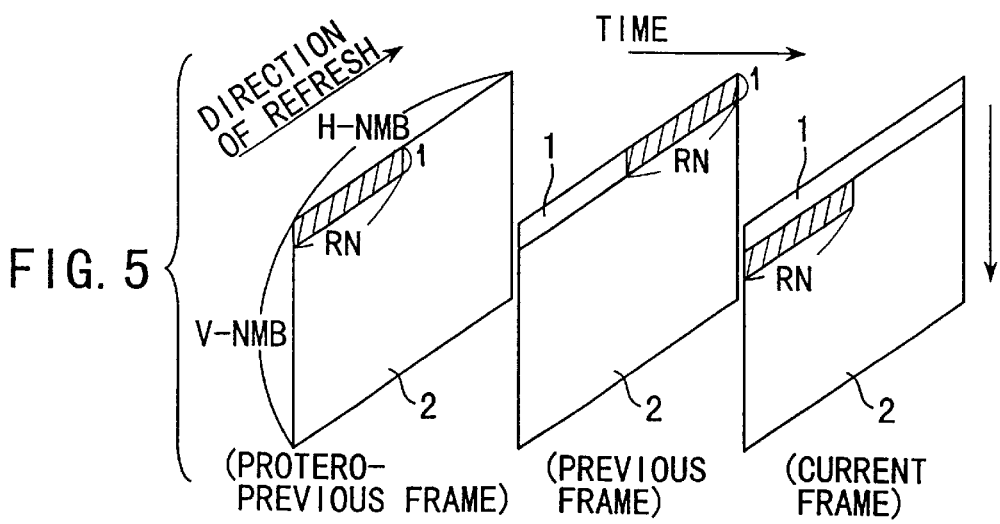
FIG. 5 is a schematic representation of a refresh operation in units of a fixed number of macroblocks.

In the above example, the refresh is performed on a horizontal line or vertical line basis. Alternatively, the refresh may be performed in units of a prescribed number of macroblocks as shown in FIG. 5. In this case, in step S105, determinations are made as to (i×V_NMB+j)/RN:N mod ((i×V_NMB+j)/RN) mod D[i][j]:FALSE.

More specifically, the above refresh mode is executed every horizontal line or every vertical line, but the refresh can be performed in units of a predetermined number (R×N) of macroblocks as shown in FIG. 5. In this case, in step S105, ((i×V_NMB+j)/RN:N mod(V_NMB×H_NMB)/RN) and (D[i][j]:FALSE) are determined. In other words, the value obtained by dividing the address (i×V_NMB+j) of the macroblock to be encoded by the predetermined number (R×N) indicates an order in which the region is to be refreshed. It is determined whether or not two conditions: one that value equals to the remainder obtained by the value of the refresh counter N by the number ((V_NMB×H_NMB)/RN) of regions to be refreshed and the other that the value of the array D[I][j] is "FALSE", are established. If the macroblock to be currently encoded belongs to the macroblock to be refreshed, the value obtained by dividing the address (i×V_NMB+j) of the macroblock to be encoded by the predetermined number (RN) equals to the remainder obtained by dividing the value of the counter N by the number ((V_NMB ×_NMB)/RN) of regions to be refreshed within the frame. Also, if the value of the array D[I][j] is "FALSE", it is determined that the corresponding macroblock to be encoded belongs to the motion region to be refreshed.

Therefore, in step S106, if the value obtained by dividing the address (i×V_NMB+j) of the macroblock to be encoded by the predetermined number RN equals to the remainder obtained by dividing the value of the counter N by the number ((V_NMB×H_NMB)/RN) of regions to be refreshed within the frame, and the value of the array D[I][j] is "FALSE" indicating the necessity of the refresh, it is determined that the refresh must be performed, and then the encoding mode information MODE is rewritten to the INTRA mode.

As described above, in this embodiment, whether to refresh a macroblock is determined based on whether it has been rewritten as a result of a change in picture after it was last refreshed. At this point, the important thing is to determine whether, if an INTRA coding macroblock, including macroblocks that have been refreshed previously, is coded in the INTER mode, it becomes NOT_CODED. If it can be determined so, the INTRA coding macroblock belongs to a still region. Even if it drops out, the effects can be suppressed by using the corresponding macroblock in the immediately preceding frame as it is. If not, the macroblock is present in a motion region. Thus, if it drops out, then the effects become serious. If the macroblock is present in a still region and has not been rewritten, it needs to be refreshed.

Figure 6:
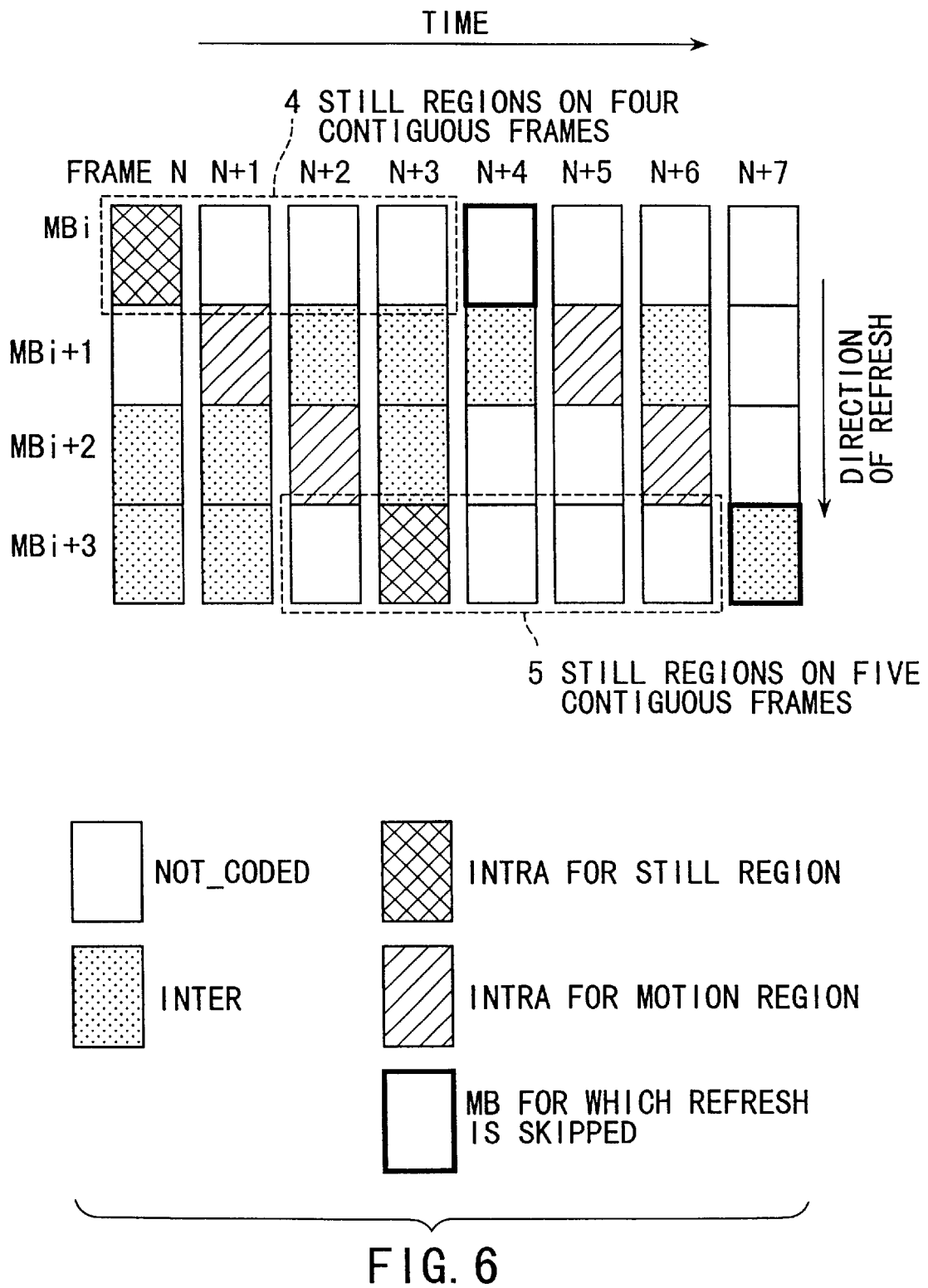
FIG. 6 is a diagram for use in explanation of the refresh operation of the video coder of FIG. 1.

FIG. 6 shows a refresh operation for horizontal macroblock lines in frame sequence. In this example, it is assumed that the cycle period of refresh is four frames and the refresh operation is performed from top to bottom of the frame.

In FIG. 6, subsequent to the INTRA macroblock MBi in a still region refreshed in frame N, NOT_CODED macroblocks, which belong to a still region, continue through four consecutive frames corresponding to the cycle of refresh. In this case, in frame N+1, the corresponding array D[i][j] value is maintained at TRUE indicating that there is no need of refresh; thus, the refresh of the macroblock MB1 in frame N+1 is skipped. Likewise, since the INTRA macroblock Mni+3 in a still region refreshed in frame N+3 is followed by NOT CODED macroblocks through frame N+6, the macroblock MBi+3 in frame N+7 is skipped. However, even if the macroblock MBi+3 is skipped in frame N+7, since it is coded in the INTER mode, it will be refreshed in the next refresh cycle.

Therefore, this embodiment ensures recovery from errors in, at the worst, a (2 cycles−1) number of frames.

Figure 7:
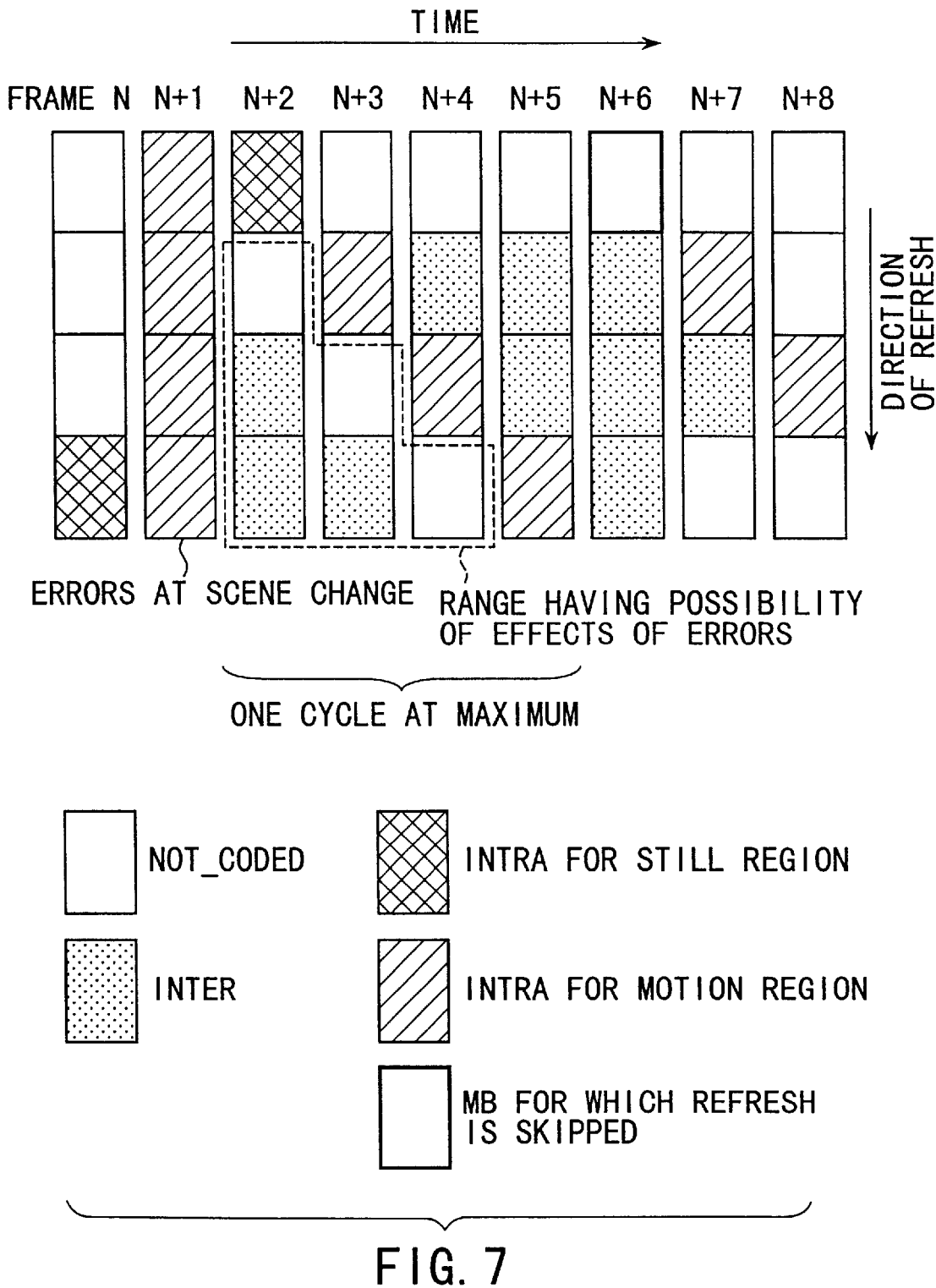
FIG. 7 is a diagram for use in explanation of the refresh operation of the video coder of FIG. 1 when there is a scene change.

FIG. 7 shows a refresh operation when there is a scene change.

When a scene change occurs in frame N+1, substantially all macroblocks in frame N+1 are coded in the INTRA mode. In this case, since each INTRA macroblock is present in a motion region, the corresponding array D[i][j] value is set to FALSE, indicating the necessity of refresh. Thus, even if the intra macroblocks in frame N+1 drop out due to errors during transmission to the decoder, error-recovery can be made relatively early after that.

In the present embodiment, as described previously, when it is determined that a frame is a scene change frame after it has been coded, the refresh location is reset to the initial value in the next frame so that the cyclic refresh is started at the top of the next frame. In the case of refresh from top to bottom, therefore, the refresh is started at the topmost macroblock line in frame N+2 following the scene change frame N+1.

In general, the frame in which a scene change occurs involves a large amount of coding and hence has a high probability of error being mixed in under the same probability of occurrence of error. In case where errors are mixed in, an effective technique, such as concealment, cannot be used due to the absence of correlation with the previous frame. When no scene change is particularly considered, the refresh-based recovery will take, at the worst, a (2 cycles−1) number of frames. However, by starting the refresh from the top of the frame immediately after scene change as in this embodiment, recovery can be made, at the worst, in one cycle as shown in FIG. 7 even if the scene change frame contains errors.

Figure 8:
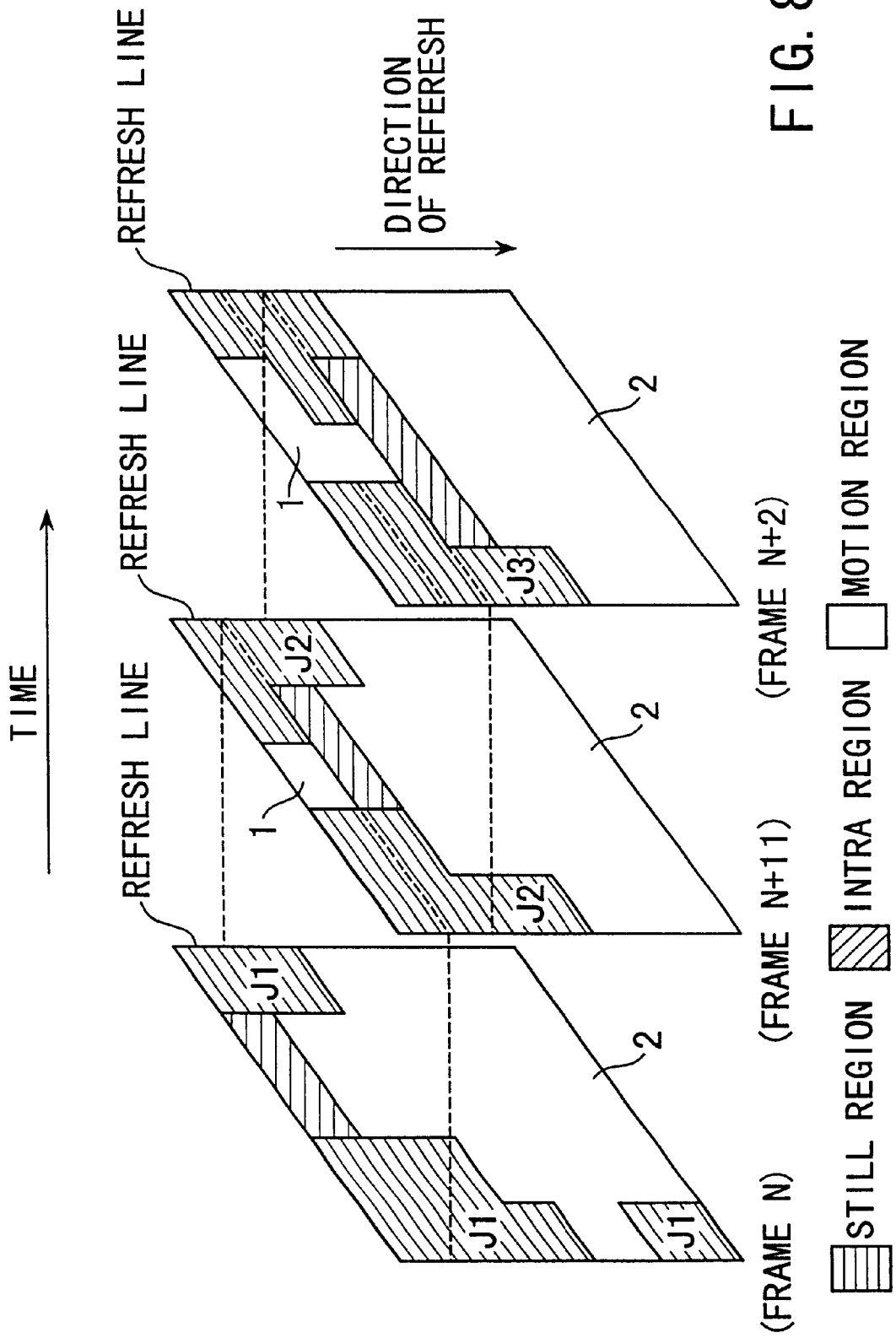
FIG. 8 is a diagram for use in explanation of restrictions on the motion vector search range in the video coder of FIG. 1.

FIG. 8 shows a relationship between INTRA coding regions inserted by refresh and still regions.

As described previously, in searching for the motion vector associated with a macroblock in a region 1 above an intra coding region in the current frame N+2, the conventional system restricts the search range from the previous frame N+1 serving as the reference frame and inhibits motion compensation from the entire region 2 which has not been refreshed yet.

However, for the still region, there is little need to inhibit motion compensation because there is little possibility of errors being mixed in. In the present embodiment, therefore, in order to lighten restrictions on the motion vector search range and thereby improve the picture quality, the motion vector search is permitted with respect to still regions (J1 in frame N, j2 in frame N+1, and J3 in frame N+2) in the region 2. This is implemented by allowing the refresh determination circuit 23 to examine motion regions and still regions in the region 2 in the reference frame using the array D[i][j] and instruct the motion compensation circuit 20 to inhibit the search of only the motion regions. The direction of refresh may be not only from top to bottom but also from bottom to top or from left to right. In this case, it is required to inhibit the search for, of motion vectors in the direction opposite to the direction of refresh, only motion vectors from regions considered as motion regions.

The first embodiment has been described as updating the array D[i][j] to the value TRUE indicating that there is no need of refresh as soon as a still INTRA macroblock appears. The conditions may be made more stringent such that, if a still INTRA macroblock appears n times (n>1), it may be considered to belong to a still region. In this case, even if an INTRA macroblock at a location drops out in n consecutive frames, error-recovery can be made by refresh.

In addition, although the embodiment has been described in terms of coding on a frame basis, the preset invention is likewise to applicable to coding on a field basis.

Next, a second embodiment of the present invention will be described below.

Figure 9:
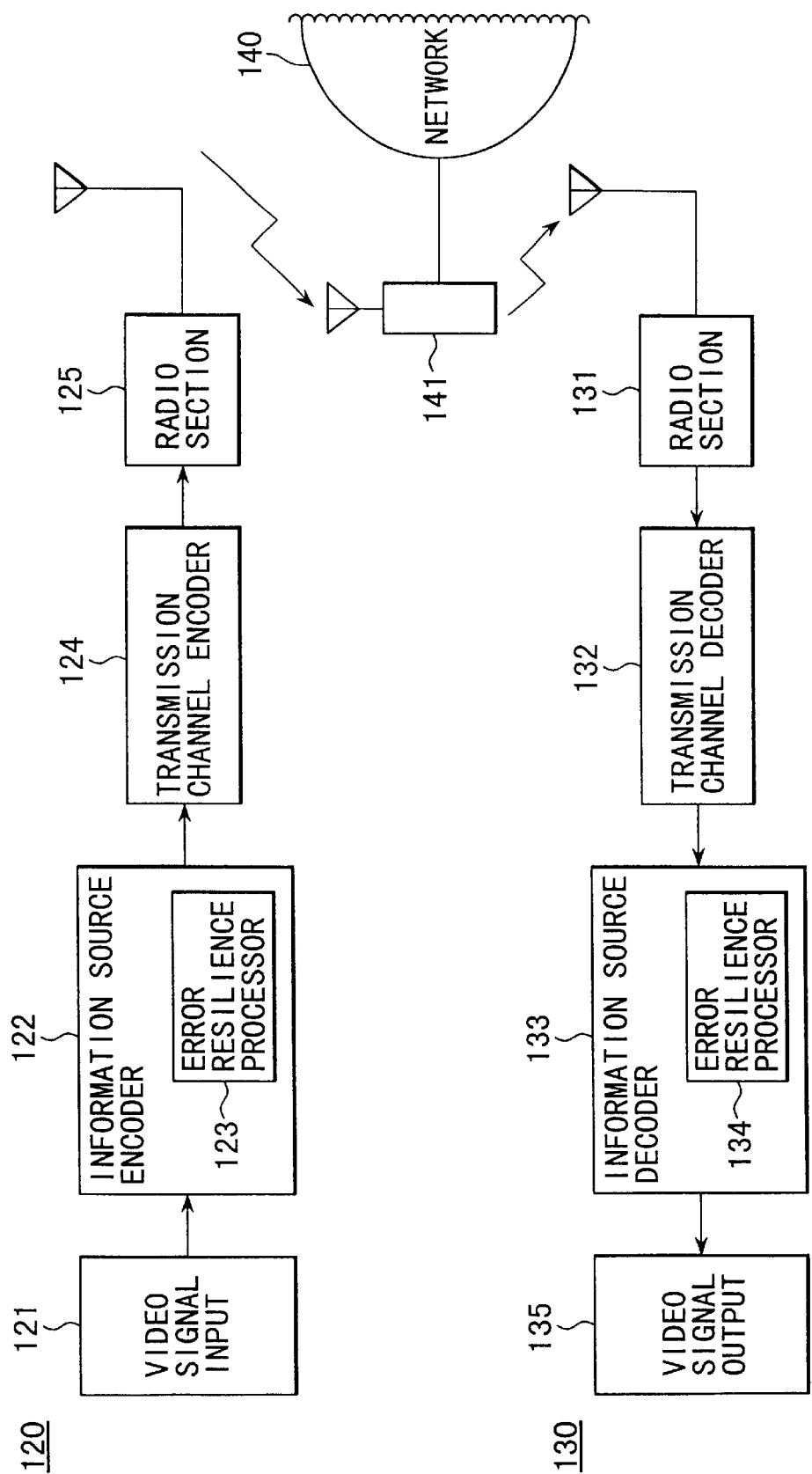
FIG. 9 is a schematic representation of a radio communication system to which the present invention is applied.

FIG. 9 shows a configuration of a radio communication system using the video coder of the present invention. The radio communication system includes a video transmission system 120 and a video reconstruction system 130. Picture information is transferred from the video transmission system to the video reconstruction system over a network 140 provided with a base station 141.

The video transmission system 120 comprises a video signal input section 121, an information source encoder section 122 having a robust processor section 123, a transmission line encoder section 123, a transmission line encoder section 124, and a radio section 125. In the information source encoder section, motion compensation, discrete cosine transform (DCT), quantization and so on are performed. In the transmission line encoder section, error detection and correction processing is performed on coded data. The information source encoder section has the video coder of FIG. 1 and the robust processor implements the above-described refresh control functions.

The video reconstruction system 130 comprises a radio section 131, an information source decoder section 133 having a robust processor 134, and a video signal output section 135. The information source decoder section is adapted to decode bit streams obtained by the video coder of FIG. 1. The robust processor 134 has error concealment functions.

Figure 10:
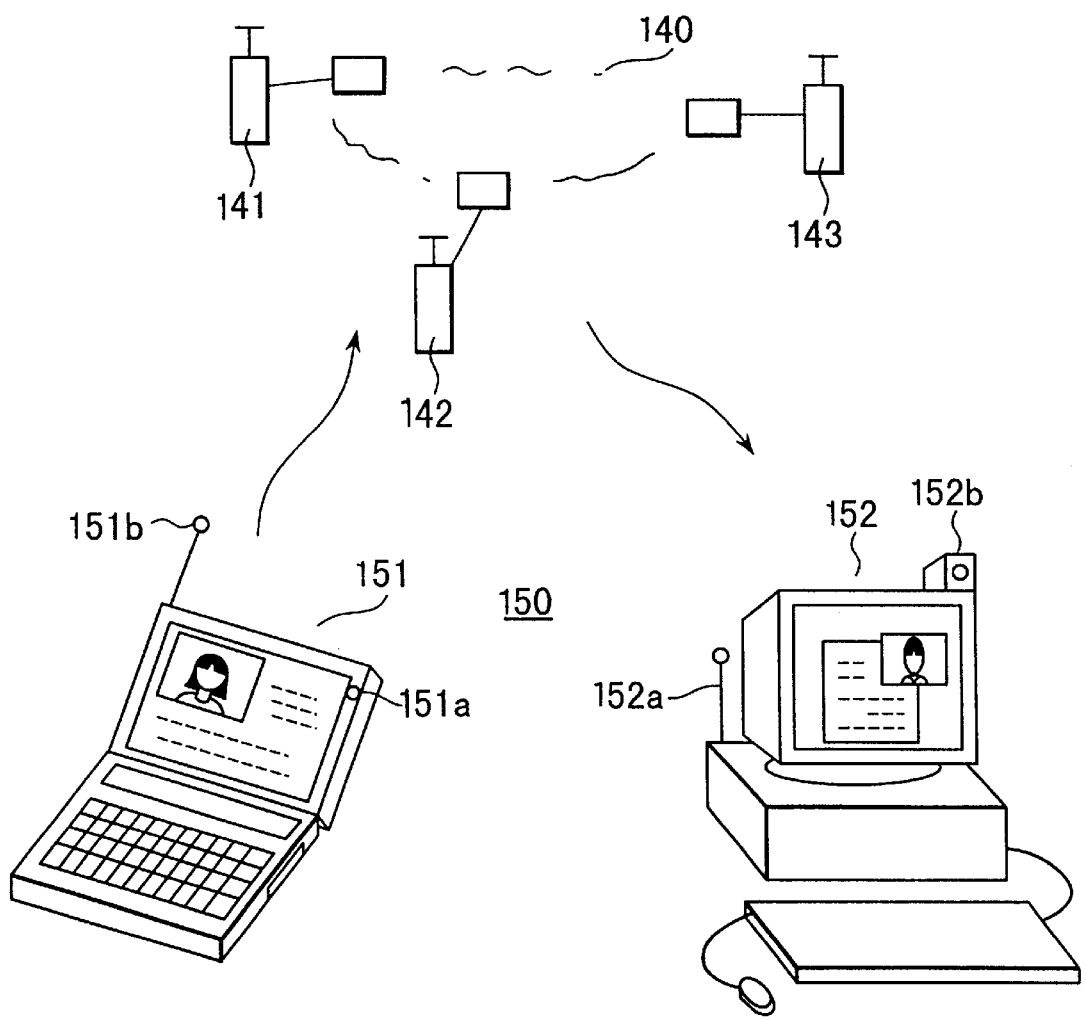
FIG. 10 shows an example of an operational form of the radio communication system of FIG. 9.
Figure 11:
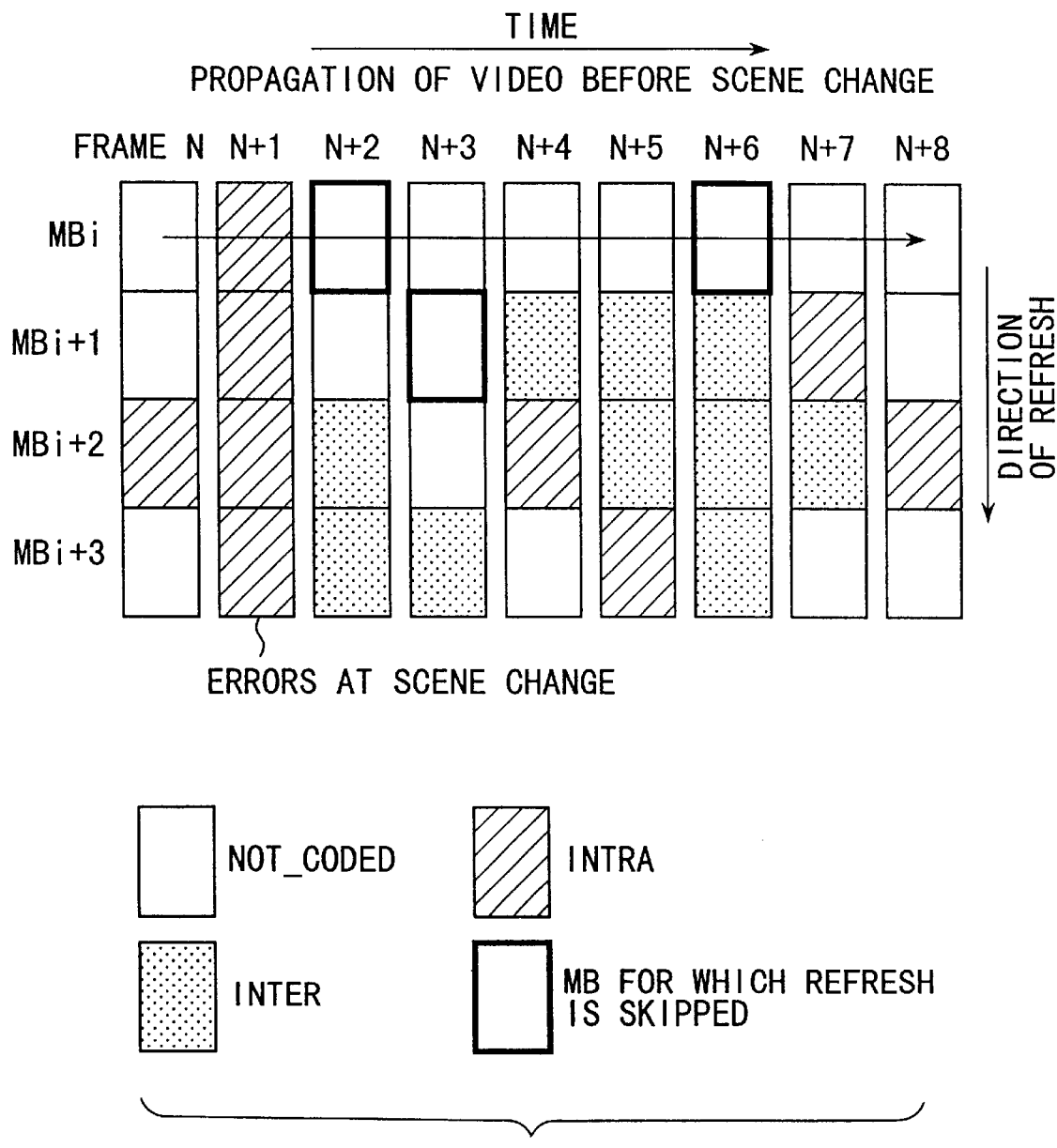
FIG. 11 is a diagram for use in explanation of the operation of a conventional adaptive refresh scheme.

FIG. 10 shows a form of operation of the radio communication system according to the second embodiment. As shown, video information is transmitted among terminals 50, such as laptop computers 151 and desktop computers 152, over a communication network 140 having base stations 141, 142, and 143.

Picture information captured by a camera 151a as a picture information input section installed in the laptop computer 151 is coded by the information coder built into the computer. The coded data outputted from the information source encoder section and other speech information and data are multiplexed together and then transmitted by radio from the radio section and an antenna 151b built into the computer. The transmitted information is sent to the network 140 through a near one of the base stations 141 to 143 to the network 140 and then received by the antenna 152a of the destination computer 152 through a near one of the base stations. The received information is demultiplexed into the picture coded information, speech information and data. The picture coded information is coded by the information source decoder section built into the computer and then displayed on the display of the computer.

Picture information captured by the camera 152b is coded in the same manner as above using the information source coder section. The coded information and other speech information and data are multiplexed together and then transmitted by radio from the antenna 152a. The transmitted radio signal is received by the antenna 151a through the network 140. The received information is demultiplexed into the picture coded information and other speech information and data. The picture coded information is decoded by the information source decoder section in the computer and then displayed on its display.

As described above, according to the present invention, by implementing the adaptive refresh operation of determining the refresh range on the basis of a determination of whether an intra-coded picture region is either a motion region or a still region, the effects of transmission errors can be lessened without increasing the amount of coding, thus allowing the picture quality to be increased. In addition, by resetting the refresh location to the initial location in the frame immediately following a scene change frame, early error-recovery can be made in the even of the dropout of the scene change frame due to transmission errors.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A video encoder comprising:

an encoding section for selectively performing an intra-coding mode for intraframe coding of an input video signal, an inter-coding mode for interframe coding, and a non-coded mode in which no coding is performed and the previous frame is used for display;

a mode selector section for adaptively selecting one coding mode among the coding modes for each predetermined region in the input video signal; and a refresh control section for detecting a motion region from within a frame and setting up an intra-coded region for refresh in a portion of a refresh range including the motion region, the refresh control section having a determination section for making a determination of, for each of intra-coded regions coded by the encoding section in the intra-coding mode, which of a motion region and a still region it belongs to and a refresh determination section responsive to the determination section for including intra-coded regions that belong to a motion region in the refresh range and excluding intra-coded regions that belong to a still region from the refresh range, and the encoding section intra-coding regions to be refreshed determined by the refresh determination section.

2. The video encoder according to claim 1, wherein the refresh control section, when the number of intra-coded regions that are considered to belong to a motion region are included in one frame in a predetermined number or more, determines that the frame is a scene change frame and changes the location at which an intra-coded region for refresh is set up in the next frame so that a cyclic refresh operation is started at an end of the next frame.

3. The video encoder according to claim 1, wherein the refresh control section shifts the location at which the intra-coded region for refresh is set up cyclically for each frame.

4. The video encoder according to claim 3, wherein the refresh control section shifts the intra-coded region in the vertical direction of frame on a macroblock line basis for each frame.

5. The video encoder according to claim 3, wherein the refresh control section shifts the intra-coded region in the horizontal direction of frame on a macroblock line basis for each frame.

6. The video encoder according to claim 3, wherein the refresh control section shifts the intra-coded region in the horizontal direction of frame in units of a predetermined number of macroblocks for each frame.

7. The video encoder according to claim 3, wherein the refresh control section, when a predetermined number of intra-coded regions that belong to a motion region or more are included in one frame, determines that the frame is a scene change frame and changes the location at which the intra-coded region for refresh is set up in the next frame so that a cyclic refresh operation is started at an end of the next frame.

8. The video encoder according to claim 3, wherein the refresh control section includes an inhibit section for, when a region in the next frame in the same location as a region in the previous frame where the intra-coded region for refresh has been set up is encoded in the inter-coding mode, inhibiting motion vector search, of motion vectors in the direction opposite to the direction of refresh, only for motion vectors from a region in the previous frame for which the determination by the refresh control section is a motion region.

9. The video coder according to claim 1, wherein the refresh control section determines that each of inter-coded regions encoded in the inter-coding mode by the encoding section is a motion region and determines the refresh range so that each inter-coded region is included in the refresh range.

10. The video encoder according to claim 1, wherein the encoder section includes a motion compensation circuit for detecting motion on a macroblock by macroblock basis from correlation between current and previous frames to generate prediction information, and wherein the mode selection circuit makes an adaptive selection between a macroblock to be encoded in the inter-coding mode and a macroblock to be encoded in the intra-coding mode on the basis of the prediction information indicating the degree of the correlation.

11. A video encoder comprising:
an encoding section for selectively performing an intra-coding mode for intraframe coding of an input video signal, an inter-coding mode for interframe coding, and a non-coding mode in which no coding is performed and the previous frame is used for display;
a mode selector section for adaptively selecting among the coding modes for each predetermined region in the input video signal; and
a refresh control section for detecting a motion region from within a frame and setting up an intra-coded region for refresh in a portion of a refresh range including the motion region, wherein
the refresh control section detects the motion region on the basis of the selected coding mode for each picture region and the determination of whether an intra-coded region belongs to a motion region, and
the encoding section intra-codes regions to be refreshed determined by the refresh determination section.

12. A video encoding method comprising the steps of:
selectively encoding an input video signal in an intraframe coding mode, an interframe coding mode, and a non-coding mode in which no coding is performed and the previous frame is used for display;
adaptively selecting among these coding modes for each picture region in the input video signal;
detecting a motion region from within a frame and setting up an intraframe coded region for refresh in a portion of a refresh range consisting of the motion region;
determining, for each intraframe coded region, which of a motion region and a still region it belongs to; and
determining the refresh range in the next frame so that intraframe coded regions that belong to the motion region are included in the refresh range and intraframe coded regions that belong to the still region are excluded from the refresh range.

13. The video encoding method according to claim 12, further comprising the step of, when a predetermined number of intraframe-coded regions that belong to a motion region or more are included in one frame, determining that the frame is a scene change frame and changing the location at which the intraframe-coded region for refresh is set up in the next frame so that a cyclic refresh operation is started at an end of the next frame.

14. The video encoding method according to claim 12, further comprising the step of shifting the location of the intraframe-coded region for refresh cyclically for each frame.

15. The video encoder according to claim 14, wherein the intraframe-coded region is shifted in the vertical direction of frame on a macroblock line basis for each frame.

16. The video encoding method according to claim 14, further comprising the step of, when a predetermined number of intraframe-coded regions that belong to a motion region or more are included in one frame, determining that the frame is a scene change frame and changing the location at which the intra-coded region for refresh is set up in the next frame so that a cyclic refresh operation is started at an end of the next frame.

17. The video encoding method according to claim 14, comprising, when interframe coding a region in the next frame in the same location as a region in the previous frame where the intraframe-coded region for refresh has been set up, inhibiting motion vector search, of motion vectors in the direction opposite to the direction of refresh, only for motion vectors from a region in the previous frame for which the determination is a motion region.

18. The video encoding method according to claim 12, wherein the refresh range determination step includes determining that each of interframe-coded regions is a motion region and determining the refresh range so that each of the interframe-coded regions is included in the refresh range.

19. A video encoding method comprising the steps of:
selectively encoding an input video signal in an intraframe coding mode, an interframe coding mode, and a non-coding mode in which no coding is performed and the previous frame is used for display;
adaptively selecting among these coding modes for each picture region in the input video signal;
detecting a motion region from within a frame and setting up an intraframe coded region for refresh in a portion of the motion region; and
detecting a motion region in the next frame on the basis of the selected coding mode for each picture region and the determination of whether an intraframe-coded region belongs to a motion region.

* * * * *